US012489736B2

(12) United States Patent
Deriso et al.

(10) Patent No.: US 12,489,736 B2
(45) Date of Patent: *Dec. 2, 2025

(54) SECURE CERTIFICATE OR KEY DISTRIBUTION FOR SYNCHRONOUS MOBILE DEVICE MANAGEMENT (MDM) CLIENTS

(71) Applicant: Omnissa, LLC, Mountain View, CA (US)

(72) Inventors: Jonathon Deriso, Suwanee, GA (US); Sagar Date, Atlanta, GA (US); Rahul Parwani, Atlanta, GA (US); Jinsong Liu, Atlanta, GA (US); Senthil Parthasarathy, Atlanta, GA (US); Shravan Shantharam, Cumming, GA (US)

(73) Assignee: Omnissa, LLC, Mountain View, CA (US)

( * ) Notice: Subject to any disclaimer, the term of this patent is extended or adjusted under 35 U.S.C. 154(b) by 220 days.

This patent is subject to a terminal disclaimer.

(21) Appl. No.: 16/804,824

(22) Filed: Feb. 28, 2020

(65) Prior Publication Data

US 2021/0273920 A1 Sep. 2, 2021

(51) Int. Cl.
*H04L 9/40* (2022.01)
*H04L 9/32* (2006.01)
*H04L 12/66* (2006.01)
*H04L 67/146* (2022.01)

(52) U.S. Cl.
CPC ........ *H04L 63/0428* (2013.01); *H04L 9/3247* (2013.01); *H04L 9/3263* (2013.01); *H04L 12/66* (2013.01); *H04L 67/146* (2013.01)

(58) Field of Classification Search
None
See application file for complete search history.

(56) References Cited

U.S. PATENT DOCUMENTS

| 7,890,084 | B1 | 2/2011 | Dudziak et al. |
| 10,057,243 | B1* | 8/2018 | Kumar ................ H04L 63/0823 |
| 10,158,982 | B2 | 12/2018 | Samdani et al. |
| 10,285,051 | B2* | 5/2019 | Alfred .................. H04L 9/0838 |
| 10,797,888 | B1* | 10/2020 | Natarajan ........... H04L 63/0428 |
| 2001/0020274 | A1* | 9/2001 | Shambroom ........... G06F 21/41 726/10 |

(Continued)

FOREIGN PATENT DOCUMENTS

EP 3059919 A1 * 8/2016 ........... H04B 5/0031

*Primary Examiner* — Jeffrey Nickerson
*Assistant Examiner* — Vadim Savenkov
(74) *Attorney, Agent, or Firm* — Kim & Stewart LLP

(57) ABSTRACT

Disclosed are various embodiments for securely distributing certificates or encryption keys. A management service can receive an enrollment request from a client device. The management service can then send a key request to a certificate provider, the key request comprising a user identifier. The management service can also send a skeleton payload to an enterprise gateway. In response, the management service can receive an encrypted profile from the enterprise gateway, the encrypted profile comprising the skeleton payload with an encryption key inserted by the enterprise gateway into the skeleton payload. Finally, the management service can send the encrypted profile to the client device.

20 Claims, 5 Drawing Sheets

(56) References Cited

U.S. PATENT DOCUMENTS

| | | | |
|---|---|---|---|
| 2005/0257260 A1* | 11/2005 | Lenoir | H04L 9/3263 726/21 |
| 2005/0278534 A1* | 12/2005 | Nadalin | H04L 9/3263 713/175 |
| 2007/0280483 A1* | 12/2007 | Fu | H04L 9/0822 380/286 |
| 2008/0019526 A1* | 1/2008 | Fu | H04L 9/0822 380/277 |
| 2010/0325714 A1* | 12/2010 | Iyer | H04W 12/062 726/8 |
| 2014/0149735 A1 | 5/2014 | Tenenboym et al. | |
| 2014/0258719 A1* | 9/2014 | Cidon | G06F 16/182 713/165 |
| 2014/0331297 A1* | 11/2014 | Innes | H04L 63/0823 726/7 |
| 2015/0242614 A1* | 8/2015 | Scagnol | G06F 21/44 726/2 |
| 2015/0280911 A1* | 10/2015 | Andoni | H04W 12/37 713/168 |
| 2016/0277374 A1* | 9/2016 | Reid | H04L 63/0435 |
| 2016/0301695 A1* | 10/2016 | Trivelpiece | H04W 12/04 |
| 2017/0041150 A1* | 2/2017 | Ishiguro | H04L 9/14 |
| 2017/0063843 A1* | 3/2017 | Vijayasankar | H04L 63/0884 |
| 2017/0085372 A1 | 3/2017 | Anderson et al. | |
| 2017/0187716 A1* | 6/2017 | Neal-Joslin | H04L 67/02 |
| 2017/0288883 A1 | 10/2017 | Goverdhan et al. | |
| 2018/0062855 A1* | 3/2018 | Bracken | H04L 9/14 |
| 2018/0115517 A1* | 4/2018 | Rotvold | G05B 19/4185 |
| 2018/0145971 A1* | 5/2018 | Mistry | H04L 63/123 |
| 2018/0199205 A1* | 7/2018 | Zhu | H04L 9/0825 |
| 2019/0044737 A1* | 2/2019 | Singhi | H04L 9/0825 |
| 2019/0379540 A1* | 12/2019 | Liderman | G06F 9/4843 |
| 2019/0394648 A1* | 12/2019 | Tipton | H04W 12/08 |
| 2021/0006418 A1* | 1/2021 | Wei | H04L 9/3247 |
| 2021/0266185 A1* | 8/2021 | Konda | H04L 12/2834 |
| 2021/0329461 A1* | 10/2021 | Bernsen | H04W 12/43 |
| 2022/0132308 A1* | 4/2022 | Bendiabdallah | H04L 63/061 |

\* cited by examiner

US 12,489,736 B2

SECURE CERTIFICATE OR KEY DISTRIBUTION FOR SYNCHRONOUS MOBILE DEVICE MANAGEMENT (MDM) CLIENTS

CROSS-REFERENCE TO RELATED APPLICATIONS

This application is related to copending U.S. patent application Ser. No. 16/804,511, entitled "SECURE CERTIFICATE OR KEY DISTRIBUTION" and filed on Feb. 28, 2020, which is incorporated by reference as if set forth herein in its entirety.

BACKGROUND

Enterprises often use third-party tools or software to assist in managing enterprise owned or enterprise affiliated devices (e.g., employee owned devices configured for use with an enterprise network or enterprise computing resources). Some of these third-party tools may be operated by the third-party on computing devices controlled by the third-party but be made accessible to customers through a network connection. Such arrangements are often referred to as "cloud computing" services. However, the use of third-party operated services on third-party controlled computing devices often provides the third-party with access to privileged, sensitive, or confidential information of customers.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for distributing data through third-party services in a secure manner. A client device may request sensitive data (e.g., encryption certificates, encryption keys, authentication credentials, etc.) from a third-party managed service. The third-party managed service may, in turn, request the sensitive data from a data repository or service (e.g., a certificate authority, provider, manager, etc.) operated by the owner of the client device. To protect the sensitive data from interception in transit, the client device can provide a public encryption key to the third-party managed service, which can relay the public encryption key to the data repository or service. The sensitive data can then be encrypted with the public key by the data repository or service. The encrypted data can then be relayed back to the client device through the third-party service.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
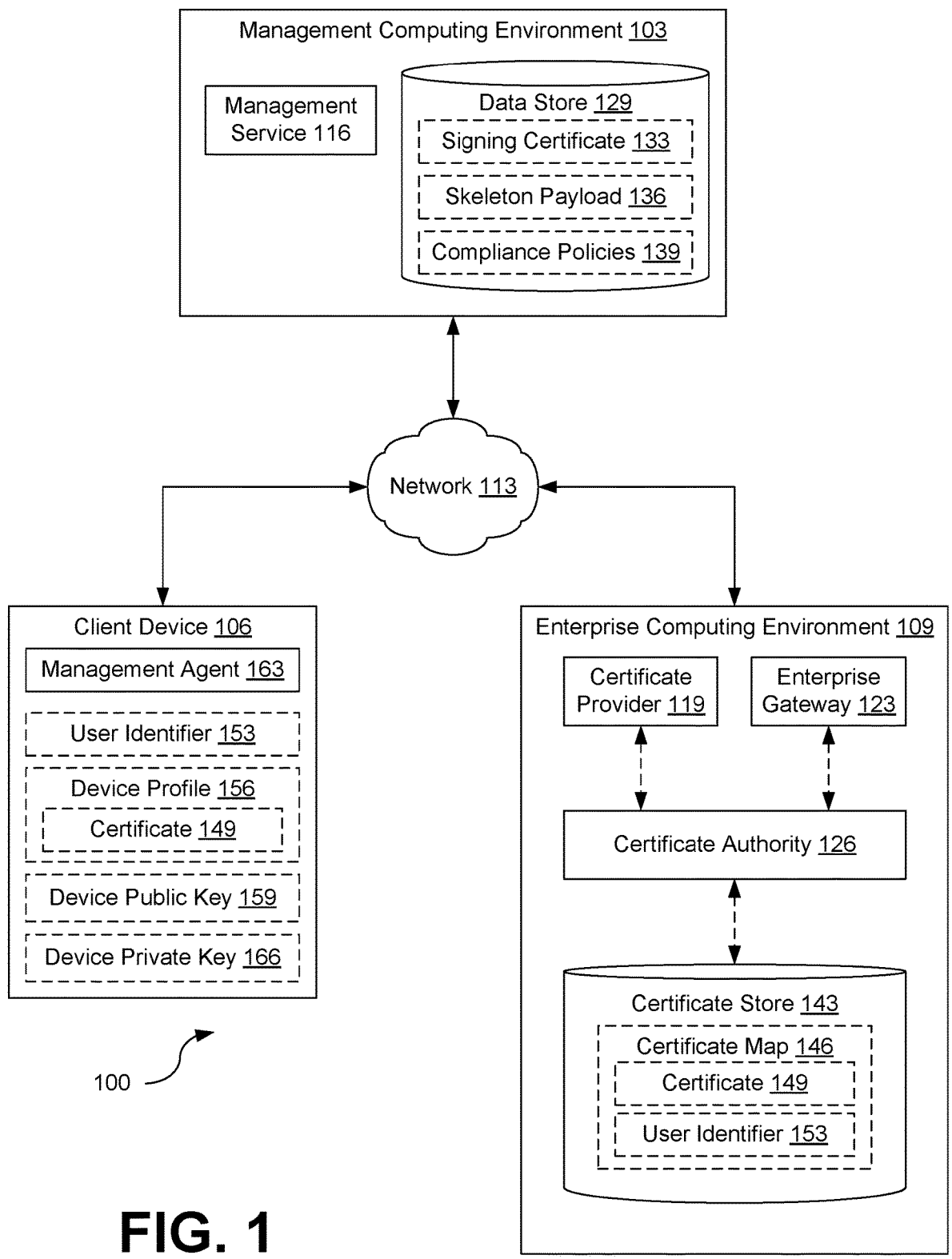
FIG. 1 is a drawing of a network environment according to various embodiments of the present disclosure.

With reference to FIG. 1, shown is a network environment 100 according to various embodiments. The network environment 100 can include a management computing environment 103, a client device 106, and an enterprise computing environment 109. Each of these entities can be in data communication with each other via a network 113.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The management computing environment 103 and the enterprise computing environment 109 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the management computing environment 103 and the enterprise computing environment 109 can employ a plurality of computing devices that can be arranged in one or more server banks or computer banks or other arrangements. Such computing devices can be located in a single installation or can be distributed among many different geographical locations. For example, the management computing environment 103 and the enterprise computing environment 109 can include a plurality of computing devices that together can include a hosted computing resource, a grid computing resource or any other distributed computing arrangement. In some cases, the management computing environment 103 and the enterprise computing environment 109 can correspond to an elastic computing resource where the allotted capacity of processing, network, storage, or other computing-related resources can vary over time.

Various applications or other functionality can be executed in the computing environment 103 or the enterprise computing environment 109. The components executed by the management computing environment 103 can include a management service 116. The components executed by the enterprise computing environment 109 can include a certificate provider 119, an enterprise gateway 123, and a certificate authority 126.

Also, various data is stored in a data store 129 that is accessible to the computing environment 103. The data store 129 can be representative of a plurality of data stores 129, which can include relational databases or non-relational databases such as object-oriented databases, hierarchical databases, hash tables or similar key-value data stores, as well as other data storage applications or data structures. The data stored in the data store 129 is associated with the operation of the various applications or functional entities described below. This data can include a signing certificate 133, a skeleton payload 136, and one or more compliance policies 139.

The signing certificate 133 can represent any cryptographic certificate for a signing key. The signing certificate 133 and respective signing key identified by the signing certificate can be used by the management service 116 to authenticate or verify responses sent by the management service 116 to a client device 106 or requests sent from the management service 116 to the enterprise computing environment 109.

The skeleton payload 136 can represent a skeleton or shell response to a mobile device management (MDM) or enterprise mobility management (EMM) request from a client device 106. For example, the skeleton payload 136 could be implemented as a file (e.g., an extensible markup language (XML) file) with blank fields for values. These blank fields for values could include a response or message identifier, a session identifier, and a field for data provided by the enterprise gateway 123 or other services, as discussed in detail later.

A compliance policy 139 can represent a definition of a required state or configuration of the client device 106. The compliance policy 139 may also specify one or more remedial actions to be performed if the client device 106 is not in the required state or match the required configuration specified by the compliance policy 139. For example, a compliance policy 139 may specify that particular encryption keys or cryptographic certificates, such as Secure/Multipurpose Internet Mail Extensions (S/MIME) or Pretty Good Privacy (PGP) keys or certificates, be installed on a client device 106. As another example, a compliance policy 139 may specify that particular applications cannot be executed at specified times of day or in specified locations defined by a geofence. As a third example, a compliance policy 139 may specify that the client device 106 cannot access specified types of data (e.g., particular documents or types of documents) at specified locations defined by a geofence. Various other compliance policies 139 may be specified by administrators as appropriate for individual users, client devices 106, or enterprises.

Likewise, various data can be stored in a certificate store 143 that is accessible to the computing environment 103. The certificate store 143 can be representative of a plurality of certificate stores 143, which can include relational databases or non-relational databases such as object-oriented databases, hierarchical databases, hash tables or similar key-value data stores, as well as other data storage applications or data structures. The data stored in the certificate store 143 is associated with the operation of the various applications or functional entities described below. This data can include a certificate map 146 for one or more certificates 149, as well as the certificates 149 themselves.

A certificate map 146 can represent a key-value store, look-up table, index or similar data structure that maintains a relationship between an issued certificate 149 and a user identifier 153. Whenever the certificate authority 126 creates or issues a certificate 149 to a user account or client device 106 associated with a user identifier 153 (e.g., a username, an email address, or other unique identifier for an individual user), an entry may be created in the certificate map 146 to store the link or association between the certificate 149 and the user identifier 153.

The certificate 149 can represent any cryptographic certificate that certifies the authenticity or identity of an encryption key or encryption key pair. For example, the cryptographic certificate 149 could provide identification and authentication for the ownership or identity of a symmetric encryption key or an asymmetric encryption key-pair. In some implementations, the certificate 149 could include the private key of the asymmetric encryption key-pair or the symmetric encryption key itself. In these instances, the private key or symmetric encryption key could be encrypted or protected by the Public Key Cryptography Key Number 12 (PKCS #12) or similar standards to allow for secure distribution of the private or symmetric key. Due to the security implementations potentially involved with a leak or disclosure of a certificate 149, distribution of the certificate 149 by an enterprise from the enterprise computing environment 109 to a client device 106 using the management service 116 may be protected using the various approaches described later in this application.

The certificate provider 119 can be executed to receive requests for a certificate 149 from the management service 116 and relay the request to the certificate authority 126. For example, in response to receipt of a user identifier 153 from the management service 116, the certificate provider 119 could send a request to the certificate authority 126 to provide a respective certificate 149 to the enterprise gateway 123. If no existing certificate 149 is mapped to the user identifier 153, then the request of the certificate provider 119 could cause the certificate authority 126 to create or issue a certificate 149 for the user identifier 153 and provide the newly created or issued certificate 149 to the enterprise gateway 123.

The enterprise gateway 123 can be executed to prepare and encrypt a response to a request for a device profile 156. For example, upon receipt of a skeleton payload 136, a user identifier 153, and a device public key 159, the enterprise gateway 123 could retrieve a respective certificate 149 from the certificate authority 126 for the user identifier 153. However, if the enterprise gateway 123 had already cached the certificate 149, the cached certificate 149 could be used instead. The enterprise gateway 123 could then insert the certificate 149 into the skeleton payload 136 to create a response for the client device 106. The enterprise gateway 123 could then encrypt the resulting response using the device public key 159 and provide it to the management service 116.

The certificate authority 126 can issue and validate cryptographic certificates 149. For example, the certificate authority 126 can issue certificates 149 to services or devices in response to a request for a certificate 149. The certificate authority 126 can also validate the authenticity of certificates 149 that have been issued by the certificate authority 126

(e.g., to evaluate whether the certificate 149 is a forgery, the certificate 149 has been revoked, etc.). For example, the certificate authority 126 can issue a certificate 149 for a user account identified by a respective user identifier 153 or client device 106 in response to request from the certificate 149. In such situations, the certificate authority 126 may add an entry to the certificate map 146 to store the relationship between a particular issued certificate 149 and a user identifier 153.

The certificate authority 126 can also provide certificates 149 to the enterprise gateway 123 in response to requests from the certificate provider 119. For example, the certificate authority 126 could receive a request for a certificate 149 for a respective user identifier 153 from the certificate provider 119. In response, the certificate authority 126 could provide the certificate to the enterprise gateway 123, which could cache the certificate 149 until such time as the enterprise gateway 123 would insert the certificate 149 into a skeleton payload 136.

The client device 106 is representative of a plurality of client devices that can be coupled to the network 113. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top steps, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as a management agent 163 or other applications. The management agent 163 can be executed to register or enroll the client device 106 with the management service 116 and to implement or enforce applicable compliance policies 139. For example, the management agent 163 may be configured to regularly contact the management service 116 to provide status updates on the operation, state, or configuration of the client device 106 and retrieve commands from the management service 116 to implement in order to bring the client device 106 into compliance with an applicable compliance policy 139. As another example, the management agent 163 may be configured to retrieve compliance policies 139 from the management service 116 and implement or enforce the compliance policies 139 on the client device 106.

To illustrate these examples, the management agent 163 could be configured to, upon registration, download a compliance policy 139 that indicates that a device profile 156 is to be installed on the client device 106. The management agent 163 could then request the device profile 156 from the management service 116. The request could cause the management service 116 to send the user identifier 153 associated with the client device 106 to a certificate provider 119 and a skeleton payload 136 to the enterprise gateway 123 and receive a device profile 156 in response, which could be relayed to the management agent 163.

Various data can also be stored on the client device. This can include a user identifier 153, a device profile 156, a device public key 159, and a device private key 166. The user identifier 153 can represent any identifier that uniquely identifies a user with respect to another user. Examples of user identifiers 153 include usernames, email addresses, and phone numbers (e.g., mobile/cellular phone numbers). A device profile 156 can represent a profile containing cryptographic information to be used by the client device 106, such as a certificate 149. The device public key 159 and device private key 166 can represent respective public and private keys of a public-private or asymmetric encryption key pair, which can be used by other services or applications or encrypt information destined for the client device 106. Examples of device public keys 159 and device private keys 166 include elliptic curve public key cryptographic key pairs and Rivest-Shamir-Adlemen (RSA) public key cryptographic key pairs.

Next, a general description of the operation of the various components of the network environment 100 is provided. More detailed descriptions of the operations of individual components are provided in the respective paragraphs describing FIGS. X-Y.

To begin, the client device 106 can enroll with the management service 116. For example, a management agent 163 installed on the client device 106 could communicate with the management service 116 to identify the user associated with the client device 106 and request any configuration settings, profiles, or applications to be installed. The enrollment processed could be performed using a number of protocols, such as mobile device management (MDM) or enterprise mobility management (EMM) protocols provided by or implemented by the operating system of the client device 106. For example, the management agent 163 could provide the user identifier 153 and a device public key 159 to the management service 116, which could evaluate one or more compliance policies 139 and provide appropriate configuration information in response.

One of the compliance policies 139 could specify that a certificate 149 for the user identified by the user identifier 153 is required to be installed on the client device 106. This could occur when an organization has user specific cryptographic certificates 149 or keys which need to be distributed to users (e.g., email certificates such as S/MIME certificates or PGP certificates). Accordingly, the management service 116 could initiate a process to retrieve the certificate(s) 149 specified by the compliance policy 139.

First, the management service 116 could send the user identifier 153 to a certificate provider 119 hosted by the enterprise computing environment 109. Upon receiving the user identifier 153, the certificate provider 119 could send a request to the certificate authority for a certificate 149 associated with the user identifier 153. In response, the certificate authority could return a certificate 149 stored in the certificate store 143 or create and return a certificate 149. Once the certificate provider 119 receives the certificate 149 from the certificate authority 126, the certificate provider 119 can forward the certificate 149 to the enterprise gateway 123. The enterprise gateway 123 can then store the certificate 149 until it receives a skeleton payload 136 from the management service 116.

In parallel, the management service 116 could also send a skeleton payload 136 and a device public key 159 to the enterprise gateway 123. In some implementations, the skeleton payload 136 could include the user identifier 153. In other implementations, the user identifier 153 could be sent in conjunction with the skeleton payload 136. Once the enterprise gateway 123 receives the skeleton payload 136, device public key 159, and user identifier 153, the enterprise gateway 123 can insert the certificate 149 linked to the user identifier 153 into the skeleton payload 136 to generate a device profile 156. The enterprise gateway 123 can then encrypt the device profile 156 with the device public key 159 to generate an encrypted device profile 156 and return the encrypted device profile 156 to the management service 116.

The management service 116 can then send the encrypted skeleton payload 136 to the management agent 163 client device 106, which can decrypt the encrypted device profile 156 with the device private key 166 to recover the device profile 156. The device profile 156, including the certificate 149, can be stored on the client device 106. As a result, the management service 116 is unable to access the certificate 149 or the device profile 156 it provides to the client device 106 on behalf of the enterprise computing environment 109. When the management service 116 is hosted in a management computing environment 103 that is operated or controlled by a separate entity from the owner or operator of the enterprise computing environment 109, this can prevent the certificate 149 for the user from being accessed by a third-party in transit.

Figure 2:
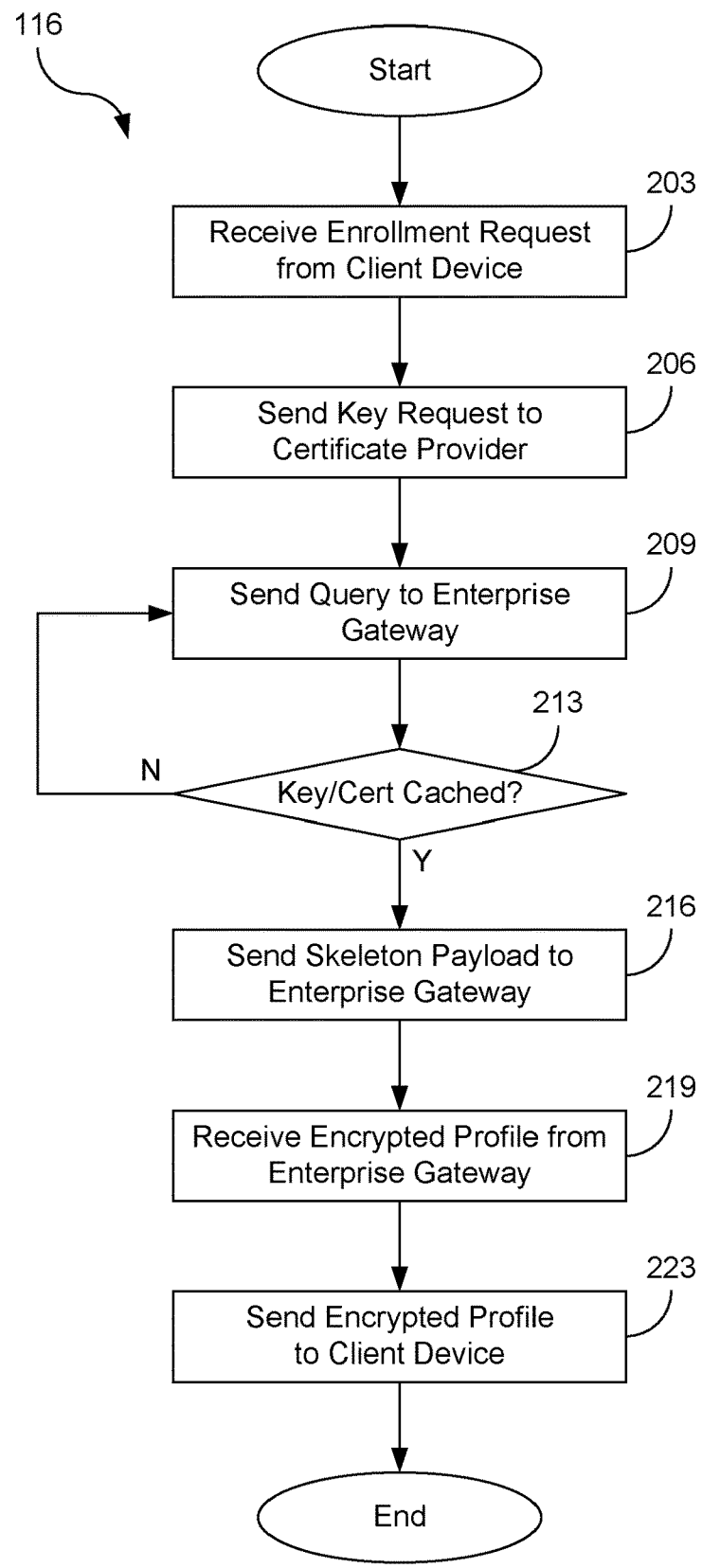
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the management service 116. The flowchart of FIG. 2 provides merely an example of the many different types of functional arrangements that can be employed to implement the operation of the depicted portion of the management service 116. As an alternative, the flowchart of FIG. 2 can be viewed as depicting an example of elements of a method implemented within the network environment 100.

Beginning with step 203, the management service 116 can receive an enrollment request from the management agent 163 executing on the client device 106. The enrollment request may be sent using an MDM or EMM channel or protocol. The enrollment request can include information such as a user identifier 153 to allow for an appropriate certificate 149 to be subsequently distributed to the client device 106. Although the term "enrollment request" is used, it is understood that the enrollment request can include a series of MDM or EMM messages as part of an initial communication between the client device 106 and the management service 116. The enrollment request can also include a copy of the device public key 159 to allow for other components to encrypt data destined for the client device 106.

Next at step 206, the management service 116 can send a key request to a certificate provider 119. This can be done in response to a determination that a compliance policy 139 specifies that the client device 106 should have one or more certificates 149 or encryption keys installed on the client device 106 for use by the user. It can also be done automatically or in response to other conditions. The key request can include the user identifier 153 receive at step 203.

Then at step 209, the management service 116 can send a query to the enterprise gateway 123 to determine whether the enterprise gateway 123 has a copy of the certificate 149 or encryption key cached. The query can include the user identifier 153. This query may be sent, for example, if the client device 106 has an MDM implementation that requires synchronous or sequential responses to MDM requests. Accordingly, the management service 116 may query the enterprise gateway 123 to determine if the certificate 149 has already been cached in order to allow for a synchronous or sequential response to be created to the MDM enrollment request received at step 203.

Proceeding to step 213, the management service 116 can evaluate the response to the query sent at step 209. If the query indicates that a certificate 149 or encryption key is currently stored by the enterprise gateway 123, then the process can proceed to step 216. If the query indicates that the certificate 149 or encryption key associated with the user identifier 153 is not stored or cached by the enterprise gateway 123, then the process can return to step 209 where another query can be sent at a predefined interval of time has passed. This can occur, for example, if the enterprise gateway 123 has not yet received a certificate associated with the user identifier 153 from the certificate authority 126 or if the enterprise gateway 123 has deleted a copy of the certificate 149 or encryption key (e.g., due to a configuration policy). The management service 116 may send keep-alive messages to the client device 106 using the MDM or EMM channel until the enterprise gateway 123 returns a response to the query indicating that the enterprise gateway 123 has a valid copy of the certificate 149 associated with the specified user identifier 153.

The process described in steps 209 and 213 may not be performed in all implementations. For example, client devices 106 with an MDM implementation that permits asynchronous or non-sequential responses may not need for the management service 116 to check if the enterprise gateway 123 has a certificate 149 already stored for the respective user identifier 153. For these client devices 106, the process may omit the functionality described for steps 209 and 213.

Moving on to step 216, the management service 116 can create and send a skeleton payload 136 to the enterprise gateway 123. The management service 116 can also send the device public key 159 for the client device 106 along with the skeleton payload 136. The skeleton payload 136 can take the form of an extensible markup language (XML) file with one or more elements that are blank, such as an element containing the requested certificate 149 or encryption key or an element containing an MDM or EMM response identifier or sequence identifier. The skeleton payload 136 may include elements that have values, such as an element specifying the user identifier 153 or an element specifying a session identifier for the MDM or EMM session.

Next at step 219, the management service 116 can receive an encrypted version of the device profile 156 from the enterprise gateway 123. As discussed in detail later, the encrypted version of the device profile 156 can be created from the skeleton payload 136 using the device public key 159. The encrypted version of the device profile 156 can also include the certificate 149. Because the certificate 149 is within the encrypted version of the device profile 156, the management service 116 is unable to access the certificate 149.

Finally at step 223, the management service 116 can send the encrypted device profile 156 to the client device 106. For example, the management service 116 may sign the encrypted device profile 156 with the signing certificate 133 to verify its authenticity to the client device 106. The management service 116 can then send an MDM or EMM response to the client device 106 (e.g., as an MDM or EMM response to the management agent 163) that includes the signed encrypted device profile 156.

Figure 3:
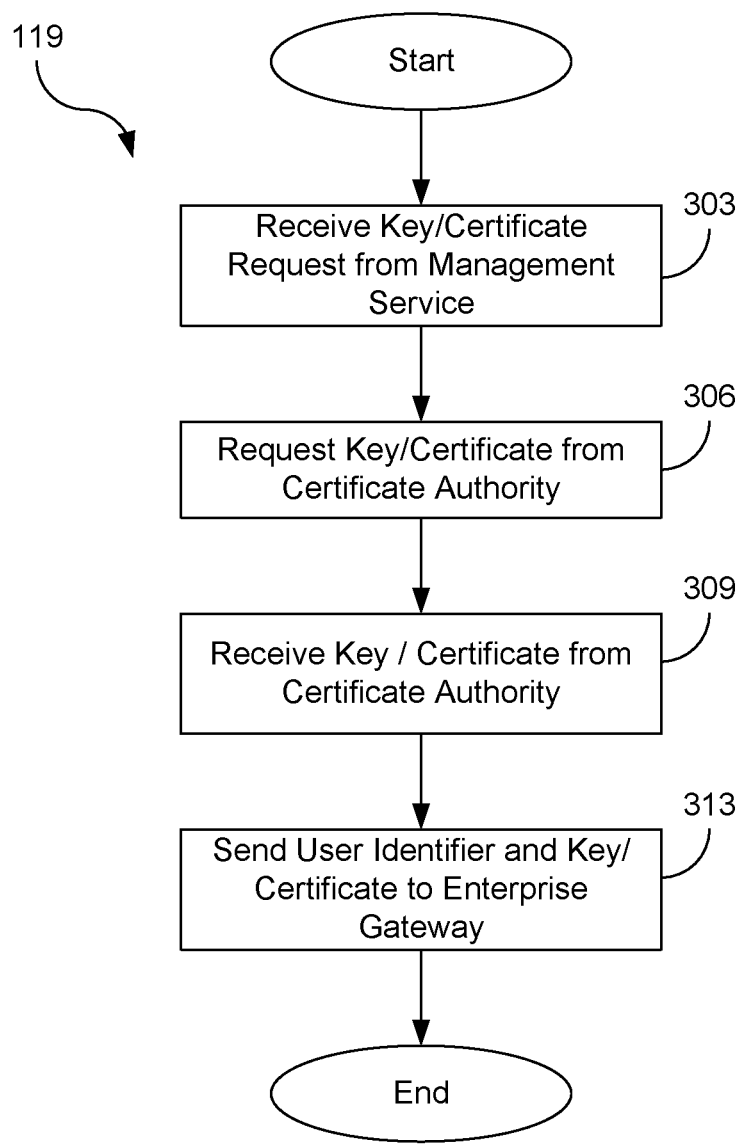
FIG. 3 is a flowchart illustrating one example of functionality implemented as portions of an application executed in a computing environment in the network environment of FIG. 1 according to various embodiments of the present disclosure.

Referring next to FIG. 3, shown is a flowchart that provides one example of the operation of a portion of the certificate provider 119. The flowchart of FIG. 3 provides merely an example of the many different types of functional arrangements that can be employed to implement the operation of the depicted portion of the certificate provider 119.

As an alternative, the flowchart of FIG. 3 can be viewed as depicting an example of elements of a method implemented within the network environment 100.

Beginning with step 303, the certificate provider 119 can receive a request for a certificate 149 or encryption key from the management service 116. The request can specify the user identifier 153 for which the certificate 149 or encryption key is desired.

Then at step 306, the certificate provider 119 can relay the request to the certificate authority 126 for the certificate 149 or encryption key. The request can include the user identifier 153. This can cause the certificate authority 126 to query a certificate map 146 in the certificate store 143 and return the certificate 149 or encryption key associated with the user identifier 153. If a certificate 149 or encryption key does not exist in the certificate store 143, which can be represented by a missing entry in the certificate map 146 for a particular user identifier 153, then the request can cause the certificate authority 126 to generate and return the certificate 149 or encryption key. If this occurs, the certificate authority 126 could also create an entry in the certificate map 146 for the user identifier 153 and the newly generated certificate 149 or encryption key for use in responding to future queries.

In some implementations, the certificate provider 119 may optionally continue the process described at steps 309 and 313. These steps are optional because, in some implementations, the certificate authority 126 may provide the certificate 149 or encryption key requested at step 306 directly to the enterprise gateway 123. In other implementations, the certificate authority 126 can instead provide the requested certificate 149 or encryption key to the certificate provider 119, which can then forward the certificate 149 or encryption key on to the enterprise gateway 123 on behalf of the certificate authority 126.

If the process proceeds to step 309, then the certificate provider 119 can receive the certificate 149 or encryption key from the certificate authority 126 in response to the request sent at step 306. Then at step 313, then the certificate provider 119 can forward the user identifier 153 and the certificate 149 or encryption key to the enterprise gateway 123, where they can be cached for future use.

Figure 4:
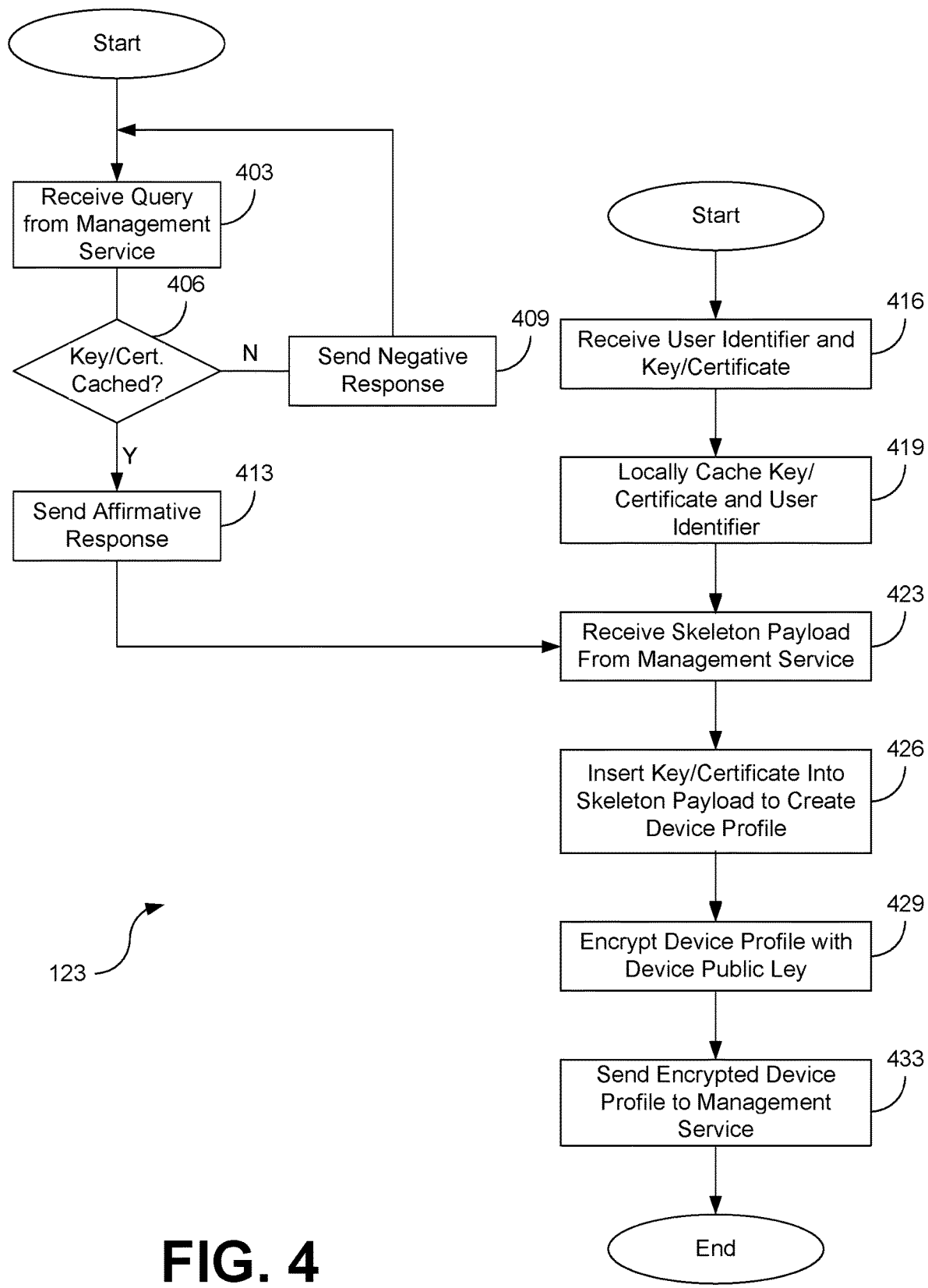
FIG. 4 is a flowchart illustrating one example of functionality implemented as portions of an application executed in a computing environment in the network environment of FIG. 1 according to various embodiments of the present disclosure.

Referring next to FIG. 4, shown is a flowchart that provides one example of the operation of a portion of the enterprise gateway 123. The flowchart of FIG. 4 provides merely an example of the many different types of functional arrangements that can be employed to implement the operation of the depicted portion of the enterprise gateway 123. As an alternative, the flowchart of FIG. 4 can be viewed as depicting an example of elements of a method implemented within the network environment 100.

It should be noted that portions of the functionality of the enterprise gateway 123 can be performed in parallel, according to particular implementations of the present disclosure. For example, the operations described for steps 403 through 413 can be performed independently and in parallel to the operations performed at steps 416 through 419. Therefore, for illustrative purposes, the enterprise gateway 123 is depicted in FIG. 4 as having two parallel and independent "start" points.

Beginning with step 403, the enterprise gateway 123 can receive a query from the management service 116 regarding whether the enterprise gateway 123 has cached or stored a copy of a certificate 149 or encryption key for a particular user. The query can include the user identifier 153 of the user in question, as previously described in FIG. 2 at box 209.

Then at box 406, the enterprise gateway 123 can determine whether or not it has received a certificate 149 or encryption key for the specified user identifier 153 from either the certificate provider 119 or certificate authority 126, as discussed later with respect to steps 416 and 419. If the enterprise gateway 123 has not received a certificate 149 or encryption key for the specified user identifier 153, or if a previously stored certificate 149 or encryption key has expired or been deleted due to a cache retention policy for the enterprise gateway 123, then process can proceed to box 409. However, if the enterprise gateway 123 has received a certificate 149 or encryption key for the user identifier 153 from the certificate provider 119 or certificate authority 126, then the process can proceed to box 413.

If the process proceeds to box 409, then the enterprise gateway 123 can send a response to the management service 116 indicating that no certificate 149 or encryption key is available for the specified user identifier 153. The process can then loop back to box 403, where the enterprise gateway 123 can wait for a subsequent request to be received from the management service 116.

However, if the process proceeds to box 413, then the enterprise gateway 123 can send a response to the management service 116 indicating that a certificate 149 or encryption key is available for the specified user identifier 153. Once the affirmative response is sent, the process can continue to box 423.

Meanwhile, at box 416, the enterprise gateway 123 can receive a certificate 149 or encryption key and an associated user identifier 153. They may be received from either the certificate provider 119 or the certificate authority 126, as previously described in the discussion of FIG. 3.

Then at box 419, the enterprise gateway 123 can locally store or cache the certificate 149 or encryption key received at box 416. This can be done to allow the enterprise gateway 123 to determine whether a certificate 149 or encryption key is available for a user identified by an associated user identifier 153 (e.g., in response to query received at box 403). This can also allow the enterprise gateway 123 to prepare a response that uses the certificate 149 or encryption key, as described in the subsequent paragraphs.

Subsequently at box 423, the enterprise gateway 123 can receive a skeleton payload 136, a user identifier 153, and a device public key 159 from the management service 116. The enterprise gateway 123 may also receive an MDM or EMM session identifier and an MDM or EMM sequence number in some implementations. In these implementations, the MDM or EMM session identifier may be provided separately from the skeleton payload 136 or already be inserted into the skeleton payload 136.

In response, at box 426, the enterprise gateway 123 can prepare a device profile 156 using the skeleton payload 136. For instance, the enterprise gateway 123 can search for the certificate 149 or encryption key associated with the user identifier 153 and insert the certificate 149 or encryption key into an appropriate element of the skeleton payload 136 reserved for the certificate 149 or encryption key. Once the certificate 149 or encryption key is inserted into the skeleton payload 136, the resulting XML file can be a device profile 156. In some implementations, additional information may be inserted into the skeleton payload 136 by the enterprise gateway 123, such as an MDM or EMM session identifier, an MDM or EMM response identifier number, or an MDM or EMM sequence number. In these implementations, this additional information may be inserted so that the client device 106 will view the eventual response received as being a valid response to the initial MDM or EMM request for a certificate 149 or encryption key. This might be useful, in particular, for client devices 106 that use a version of MICROSOFT WINDOWS® as an operating system.

Then at box 429, the enterprise gateway 123 can also encrypt the device profile 156 with the device public key 159 to create an encrypted device profile 156. This can be done to protect the device profile 156 from interception (e.g., by the operator of the management service 116 or management computing environment 103).

Finally, at box 433, the enterprise gateway 123 can send the encrypted device profile 156 to the management service 116, which in turn can relay the encrypted device profile to the management agent 163 executing on the client device 106 as previously described.

Figure 5:
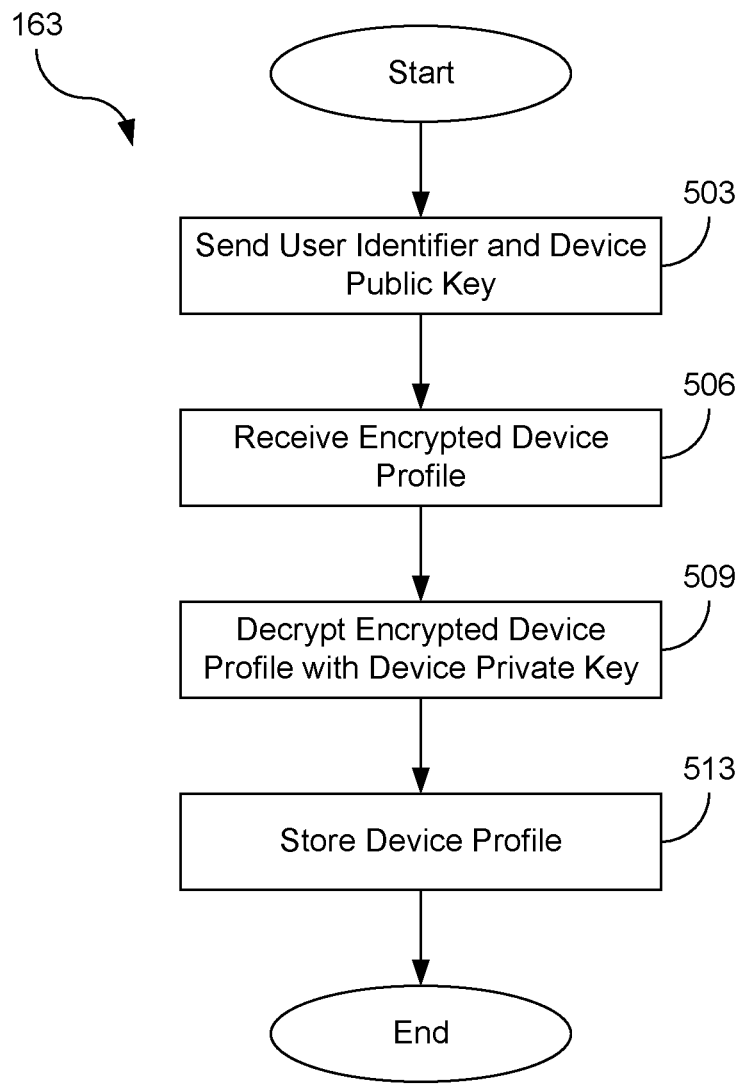
FIG. 5 is a flowchart illustrating one example of functionality implemented as portions of an application executed in a computing environment in the network environment of FIG. 1 according to various embodiments of the present disclosure.

Referring next to FIG. 5, shown is a flowchart that provides one example of the operation of a portion of the management agent 163. The flowchart of FIG. 5 provides merely an example of the many different types of functional arrangements that can be employed to implement the operation of the depicted portion of the management agent 163. As an alternative, the flowchart of FIG. 5 can be viewed as depicting an example of elements of a method implemented within the network environment 100.

Beginning with step 503, the management agent 163 can send a user identifier 153 and a device public key 159 to the management service 116. This information may be sent to the management service 116 as part of an enrollment or registration process performed by the management agent 163 to enroll the client device 106 with the management service 116. The user identifier 153 and the device public key 159 may be sent, for example, using a request that is compliant with an MDM or EMM implementation provided by the operating system of the client device 106.

Next at step 506, the management agent 163 can receive an encrypted device profile 156 from the management service 116.

At step 509, the management agent 163 can decrypt the encrypted device profile 156 to generate an unencrypted device profile 156. For example, the management agent 163 could use the device private key 166 to decrypt the encrypted device profile 156. In some implementations, the management agent 163 may also verify a signature of the encrypted device profile 156 to confirm that the encrypted device profile 156.

Then at step 513, the management agent 163 can store the device profile 156 on the client device 106. As a result, the client device 106 is able to access the certificate 149 or encryption key included in the device profile 156 for subsequent encryption operations (e.g., email encryption).

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each step can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each step can represent a circuit or a number of interconnected circuits to implement the specified logical function or functions.

Although the flowcharts show a specific order of execution, it is understood that the order of execution can differ from that which is depicted. For example, the order of execution of two or more steps can be scrambled relative to the order shown. Also, two or more steps shown in succession can be executed concurrently or with partial concurrence. Further, in some embodiments, one or more of the steps shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
    a computing device comprising a processor and a memory; and
    machine-readable instructions stored in the memory that, when executed by the processor, cause the computing device to at least:
        receive, by a management service on the computing device, an enrollment request from a client device, wherein the client device has stored therein a client device key pair comprising a client device public key and a respective client device private key, and wherein the enrollment request comprises the client device public key;
        send a key request from the management service to a certificate provider to provide an encryption key to an enterprise gateway to store locally, the key request comprising a user identifier;
        send a query from the management service to the enterprise gateway to determine if the enterprise gateway has a locally stored copy of the encryption key associated with the user identifier;
        receive, by the management service, a reply to the query, the reply indicating that the enterprise gateway has the locally stored copy of the encryption key associated with the user identifier;
        in response to receipt of the reply to the query, send a skeleton payload and the client device public key from the management service to the enterprise gateway;
        receive, by the management service, an encrypted profile from the enterprise gateway, the encrypted profile comprising the skeleton payload with the encryption key inserted by the enterprise gateway into the skeleton payload, wherein the encrypted profile is encrypted by the enterprise gateway using the client device public key, wherein the management service does not have access to the client device private key to decrypt the encrypted profile; and
        relay the encrypted profile from the management service to the client device, wherein the client device decrypts the encrypted profile using the client device private key to obtain access to the encryption key in the skeleton payload.

2. The system of claim 1, wherein the machine-readable instructions further cause the computing device to at least:
    retrieve a request identifier from the enrollment request;
    generate a response identifier based at least in part on the request identifier; and
    insert the response identifier into the skeleton payload, where the skeleton payload is sent to the enterprise gateway subsequent to insertion of the response identifier.

3. The system of claim 1, wherein the machine-readable instructions further cause the computing device to at least:
    retrieve a session identifier from the enrollment request; and
    insert the session identifier into the skeleton payload, wherein the skeleton payload is sent to the enterprise gateway subsequent to insertion of the session identifier.

4. The system of claim 1, wherein the encrypted profile further comprises a certificate included in the skeleton payload and the certificate comprises the encryption key.

5. The system of claim 4, wherein the certificate is a Secure/Multipurpose Internet Mail Extensions (S/MIME) certificate.

6. The system of claim 1, wherein the machine-readable instructions further cause the management service on the computing device to sign the encrypted profile with a signing certificate.

7. The system of claim 1, wherein the enrollment request comprises the user identifier.

8. A method, comprising:
   receiving, by a management service operating on a computing device, an enrollment request from a client device, wherein the client device has stored therein a client device key pair comprising a client device public key and a respective client device private key, and wherein the enrollment request comprises the client device public key;
   sending a key request from the management service to a certificate provider to provide an encryption key to an enterprise gateway to store locally, the key request comprising a user identifier;
   sending a query from the management service to the enterprise gateway to determine if the enterprise gateway has a locally stored copy of the encryption key associated with the user identifier;
   receiving, by the management service, a reply to the query, the reply indicating that the enterprise gateway has the locally stored copy of the encryption key associated with the user identifier;
   in response to receiving the reply to the query, sending a skeleton payload and the client device public key from the management service to the enterprise gateway;
   receiving, by the management service, an encrypted profile from the enterprise gateway, the encrypted profile comprising the skeleton payload with the encryption key inserted by the enterprise gateway into the skeleton payload, wherein the encrypted profile was encrypted by the enterprise gateway using the client device public key, wherein the management service does not have access to the client device private key to decrypt the encrypted profile; and
   relay the encrypted profile from the management service to the client device, wherein the client device decrypts the encrypted profile using the client device private key to obtain access to the encryption key in the skeleton payload.

9. The method of claim 8, further comprising:
   retrieving a request identifier from the enrollment request;
   generating a response identifier based at least in part on the request identifier; and
   inserting the response identifier into the skeleton payload, where the skeleton payload is sent to the enterprise gateway subsequent to insertion of the response identifier.

10. The method of claim 8, further comprising:
    retrieving a session identifier from the enrollment request; and
    inserting the session identifier into the skeleton payload, wherein the skeleton payload is sent to the enterprise gateway subsequent to insertion of the session identifier.

11. The method of claim 8, wherein the encrypted profile further comprises a certificate included in the skeleton payload and the certificate comprises the encryption key.

12. The method of claim 11, wherein the certificate is a Secure/Multipurpose Internet Mail Extensions (S/MIME) certificate.

13. The method of claim 8, further comprising signing, by the management service, the encrypted profile with a signing certificate.

14. The method of claim 8, wherein the enrollment request comprises the user identifier.

15. A non-transitory, computer-readable medium, comprising machine-readable instructions that, when executed by a processor of a computing device, cause the computing device to at least:
    receive, by a management service operating on the computing device, an enrollment request from a client device, wherein the client device has stored therein a client device key pair comprising a client device public key and a respective client device private key, and wherein the enrollment request comprises the client device public key;
    send a key request from the management service to a certificate provider to provide an encryption key to an enterprise gateway to store locally, the key request comprising a user identifier;
    send a query from the management service to the enterprise gateway to determine if the enterprise gateway has a locally stored copy of the encryption key associated with the user identifier;
    receive, by the management service, a reply to the query, the reply indicating that the enterprise gateway has the locally stored copy of the encryption key associated with the user identifier;
    in response to receipt of the reply to the query, send a skeleton payload and the client device public key from the management service to the enterprise gateway;
    receive, by the management service, an encrypted profile from the enterprise gateway, the encrypted profile comprising the skeleton payload with the encryption key inserted by the enterprise gateway into the skeleton payload, wherein the encrypted profile is encrypted by the enterprise gateway using the client device public key, wherein the management service does not have access to the client device private key to decrypt the encrypted profile; and
    relay the encrypted profile from the management service to the client device, wherein the client device decrypts the encrypted profile using the client device private key to obtain access to the encryption key in the skeleton payload.

16. The non-transitory, computer-readable medium of claim 15, wherein the machine-readable instructions, when executed by the processor, further cause the computing device to at least:
    retrieve a request identifier from the enrollment request;
    generate a response identifier based at least in part on the request identifier; and
    insert the response identifier into the skeleton payload, where the skeleton payload is sent to the enterprise gateway subsequent to insertion of the response identifier.

17. The non-transitory, computer-readable medium of claim 15, wherein the machine-readable instructions further cause the computing device to at least:
    retrieve a session identifier from the enrollment request; and insert the session identifier into the skeleton payload, wherein the skeleton payload is sent to the enterprise gateway subsequent to insertion of the session identifier.

18. The non-transitory, computer-readable medium of claim 15, wherein the encrypted profile further comprises a certificate included in the skeleton payload and the certificate comprises the encryption key.

19. The non-transitory, computer-readable medium of claim 18, wherein the certificate is a Secure/Multipurpose Internet Mail Extensions (S/MIME) certificate.

20. The non-transitory, computer-readable medium of claim 15, wherein the machine-readable instructions further cause the management service on the computing device to sign the encrypted profile with a signing certificate.

* * * * *